Figure 1:
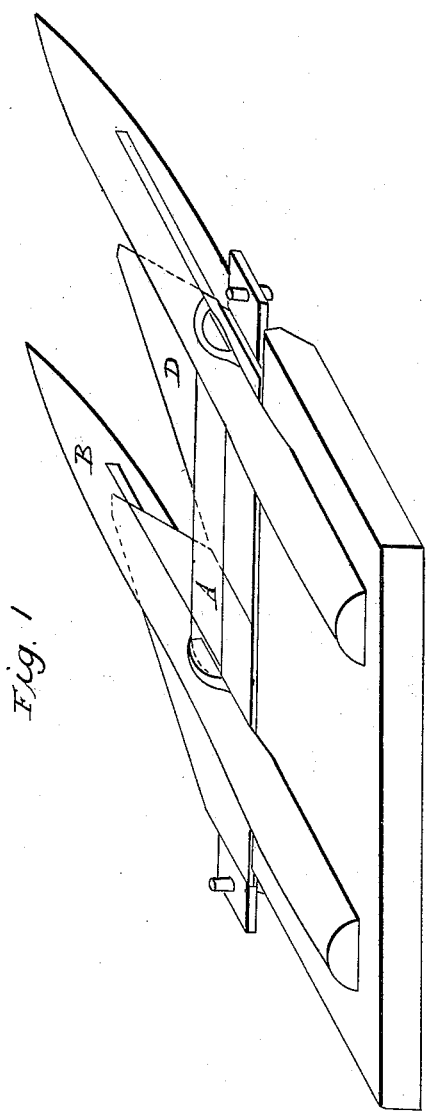

W. F. KETCHUM.
Harvester Cutter.

No. 22,655.

2 Sheets—Sheet 1.

Patented Jan'y 18, 1859.

W. F. KETCHUM.
Harvester Cutter.

No. 22,655.

2 Sheets—Sheet 2.

Patented Jan'y 18, 1859.

UNITED STATES PATENT OFFICE.

WILLIAM F. KETCHUM, OF BUFFALO, NEW YORK.

IMPROVEMENT IN HARVESTERS.

Specification forming part of Letters Patent No. 22,655, dated January 18, 1859.

*To all whom it may concern:*

Be it known that I, WILLIAM F. KETCHUM, of Buffalo, in the county of Erie and State of New York, have invented an Improvement in Harvesting-Machines, by which, among other advantages, the fine and dead grass is prevented from clogging the machine and the guard-fingers are strengthened and supported; and I do hereby declare that the following is a full and exact description thereof, reference being had to the accompanying drawings and the letters of reference marked thereon.

To enable others skilled in the art to make and use my invention, I will proceed to describe its construction and operation.

In most harvesting-machines as now built knives (saw-shaped) vibrate through slots in guard-fingers, and each section of the knife has a base about one and one-half inch wide; and when these sections are riveted upon the knife-rod there is a base from one to two inches wide, which vibrates through the slots of the guard, which has no cutting part, and the fine grass is drawn back of the cutting part and forced into the slot, and wedges in and stops the vibrations of the knife. I remedy this evil by placing a strip of iron or other metal (marked letter A) between the guards over the lower or blank part of the knife-sections, either at or a little forward of the bottom of the cut or angle formed by the cutting-edge of the knife-sections. I fasten each end of this piece or strip to the finger-guard on each side; or it may be riveted to the cutter-bar by having an arm extending back so as to rivet the arm to the cutter-bar, and then the strip and arm will resemble the letter T.

In the drawings, the finger-guards are marked by the letter B and the knife-sections by the letter D. By placing this cap-piece in this manner, or by casting the guards with projections on the sides of the top part of the guard, and at right angles with the slot of the guard, said projections may be long enough to meet each other or to extend partly across. The grass which is drawn through the slot in the guard by the vibrations of the knife is prevented from being drawn back of the angle formed by the cutting-edge of the knife-sections, as they are riveted on the knife bar or rod, and the fine and dead grass is thereby held where the knives can cut it and clear themselves, so as not to be clogged.

Figure 2:
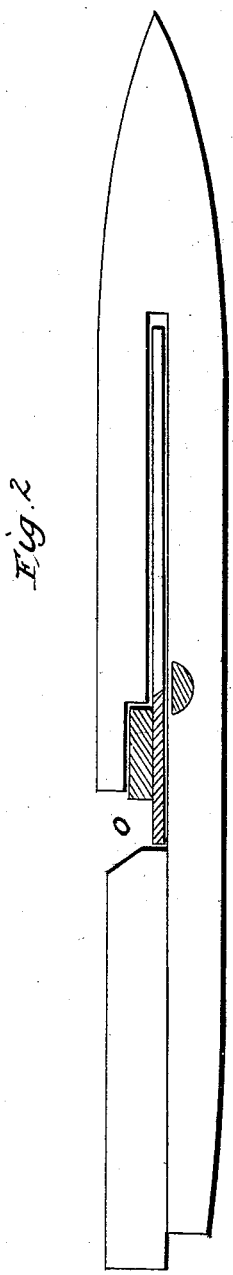

On the under side of the cutter much of the grass which is likely to be drawn in between the guard-tooth and cutter or cutter-bar has one end attached to the ground to which it grows, and when partially released at the return-stroke of the cutter will be drawn out by the adhesion of the roots to the ground, and the remainder will be brushed out by the stubble through the opening in the lower prong of the guard-tooth; but that portion of the grass which is above the cutter is nearly all severed from the root or stubble, and falls directly upon the cutters and between the guard-teeth, in the worse position possible, or in a position the most exposed to be drawn into the slot in the guard-finger by the vibrations of the cutters, without anything to draw or brush it out, and remaining permanently, it soon wedges and stops the motion of the cutters. The true policy, therefore, is to place the caps on the top of the cutter to prevent the drawing in of the straws at that point, where there is no auxiliary to clear them out, and to make the opening in the guard-tooth for clearing at the bottom, where gravity, the brushing effect of the stubble, &c., will aid in the operation. Thus while I place the cap above the cutter, as as A, the opening from the slot in the guard-tooth I make in the lower prong, as at O in Fig. 2. By this arrangement of devices clogging is prevented much more effectually than by placing them in the reversed position.

Having thus described my invention and some of its advantages, I will remark that I do not here claim the use of a cap or an opening in the guard-tooth generally to prevent clogging; but

I claim—

The combination of the openings in the guard-tooth below the cutters with the caps above the cutters, substantially as described.

WM. F. KETCHUM.

Attest:
JOHN S. HOLLINGSHEAD,
E. G. HANDY.